Dec. 14, 1954     I. H. WENSINK     2,696,867
APPARATUS AND METHOD FOR COPY PREPARATION AND MAKE-UP
Filed Sept. 27, 1948     7 Sheets-Sheet 2

Inventor:
Irwin H. Wensink,
By Cushman, Darby & Cushman
Attorneys.

Dec. 14, 1954     I. H. WENSINK     2,696,867
APPARATUS AND METHOD FOR COPY PREPARATION AND MAKE-UP
Filed Sept. 27, 1948     7 Sheets-Sheet 3

Inventor:
Irwin H. Wensink,
By Cushman, Darby & Cushman
Attorneys.

Dec. 14, 1954  I. H. WENSINK  2,696,867
APPARATUS AND METHOD FOR COPY PREPARATION AND MAKE-UP
Filed Sept. 27, 1948  7 Sheets-Sheet 4

Inventor:
Irwin H. Wensink,
By Cushman, Darby & Cushman
Attorneys.

Dec. 14, 1954     I. H. WENSINK     2,696,867
APPARATUS AND METHOD FOR COPY PREPARATION AND MAKE-UP
Filed Sept. 27, 1948     7 Sheets-Sheet 7

Inventor:
Irwin H. Wensink,
By Cushman, Darby & Cushman
Attorneys.

United States Patent Office 2,696,867
Patented Dec. 14, 1954

2,696,867

APPARATUS AND METHOD FOR COPY PREPARATION AND MAKE-UP

Irwin H. Wensink, Bethesda, Md.

Application September 27, 1948, Serial No. 51,468

16 Claims. (Cl. 154—42.3)

The present invention relates to apparatus and methods for copy preparation and makeup.

Much consideration has recently been given to the practice of producing printing plates from typewritten copy so that the costly process of typesetting can be avoided. However, several factors have heretofore greatly hindered wide acceptance of this practice. One such factor has been that the finished work produced through the use of typewritten copy has been of inferior appearance from both aesthetic and functional standpoints. Furthermore, the systems heretofore followed and involving the use of typewritten copy have lacked the flexibility and precision which the use of set type makes available in both page makeup and in the making of corrections, adjustments, and the like. Such methods as have heretofore been developed in an effort to overcome the above-mentioned deficiencies are either cumbersome, ineffective, or excessively costly. In addition to embodying these serious deficiencies in appearance, flexibility, and precision, the systems and devices heretofore used in assembling, adjusting, and adding other elements to the typewritten copy preparatory to plate making render the plate making process costly by interfering with the utilization of transparent copy sheets in place of photographically produced transparencies.

An object of the present invention is to provide efficient apparatus and methods of copy preparation and makeup which are of such nature that their use with typewritten copy will overcome the above-mentioned deficiencies previously associated with the use of such copy.

A further object of the invention is to provide methods and apparatus having the above-stated characteristics for copy preparation and makeup and, which, in addition, are practicable for use with copy sheets of almost any material, including material which is light-transmissive, viz., transparent or translucent. Ancillary to this object is that of providing methods and apparatus of such nature that all necessary operations can be performed without affecting the light-transmissive qualities of the copy sheets.

Another object of the invention is to provide apparatus and methods whereby copy sheets, or portions of copy sheets, can be quickly and properly located with respect to each other and then secured together.

Still another object of the invention is to provide an arrangement for cutting a sheet along an accurately determined line properly located with respect to an edge of the sheet.

A further object of the invention is to provide apparatus and methods whereby copy sheets can be ruled or drawn upon, or art work, charts, tabular matter, or other matter may be accurately positioned upon a sheet or accurately secured to a sheet in edgewise relation thereto.

Another object of the invention is to enable lines of copy or other matter to be accurately positioned upon a sheet.

Still another object of the invention is to provide simple and effective apparatus and methods for permitting character elements mounted on backing sheets to be assembled, removed from the backing sheets, and applied to another sheet.

It has heretofore been proposed to provide character elements comprising flexible sheets secured to backing sheets and assemble such elements in a composing stick and then secure them together by means of adhesive tape for subsequent placement upon a copy sheet or the like. However, these previous arrangements have been unsatisfactory when working with copy sheets which are intended to be light-transmissive. One difficulty has been the fact that the adhesive tape had to be placed directly over the characters and had to be retained after the character elements were applied to a copy sheet. These requirements have been objectionable because foreign matter adhered to the adhesive and the retained tape effected light-transmissiveness.

Other objects and advantages of the invention will be apparent from the following description and accompanying drawings.

Referring to the drawings.

Referring to Figures 1 to 6, the numeral 10 generally designates a cabinet or supporting frame which includes a bottom wall 11 (Fig. 3), two side walls 12 and 13, respectively, a front end wall 14 and a rear end wall 15.

Figures 3, 4, 6:
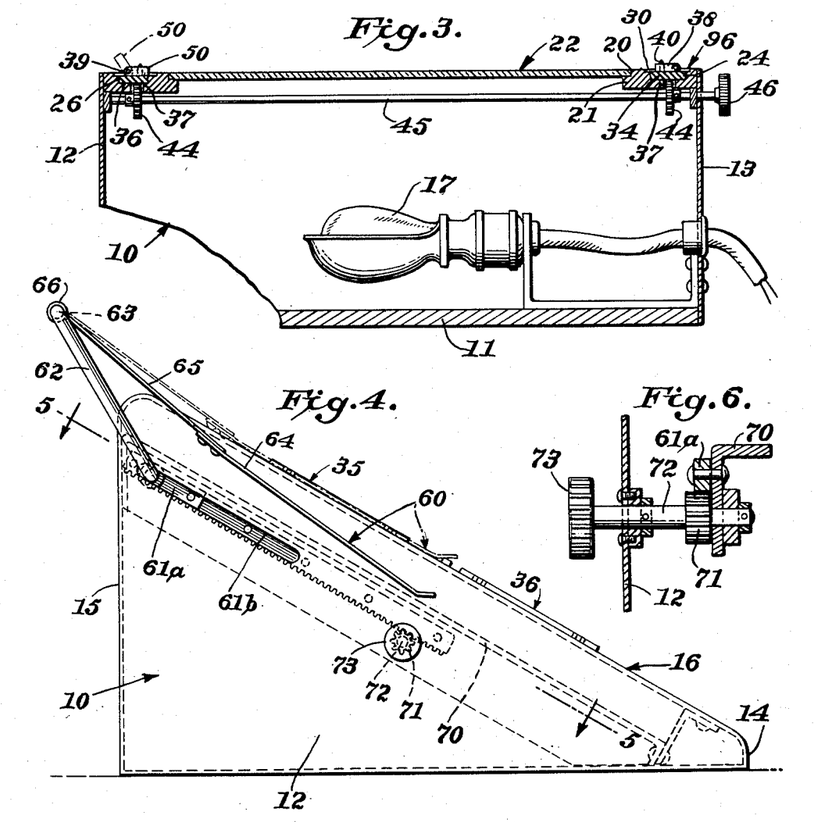
Figure 3 is a transverse vertical section on the line 3—3 of Figure 1.
Figure 4 is a side elevation of the Figure 1 device on a more reduced scale, the view looking toward Figure 1 from the left.
Figure 6 is a detail section on the line 6—6 of Figure 5.

As is best indicated in Figure 4, the top wall generally designated 16 slopes upwardly from the front wall 14 to the rear wall 15 and merges with the end walls along curved lines. The inclination of top wall 16 adds to the convenience of working thereon and the curvature at its ends enables sheets of paper being worked upon to extend down along the end walls. A lamp 17 is positioned within cabinet 10 as shown in Figure 3.

Figure 1:
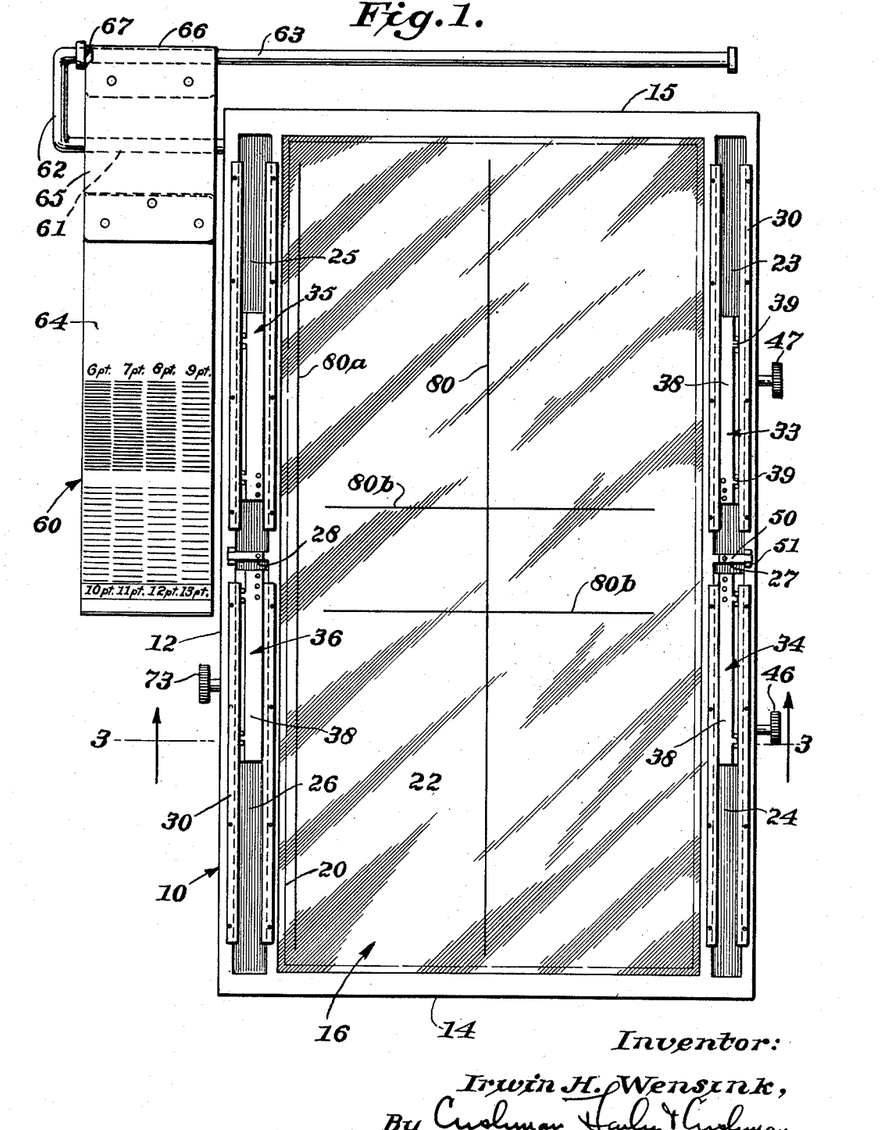
Figure 1 is a plan view of a makeup and copy preparation apparatus constructed in accordance with the invention.

As is best shown in Figures 1 and 3, top wall 16 has the greater portion of its surface area cut away to provide a large opening 20 provided with a ledge 21 upon which is fitted a sheet 22 of translucent material, such as glass or plastic. The upper surface of sheet 22 provides a work or sheet supporting surface and is flush with the upper surface of top wall 16.

Figure 2:
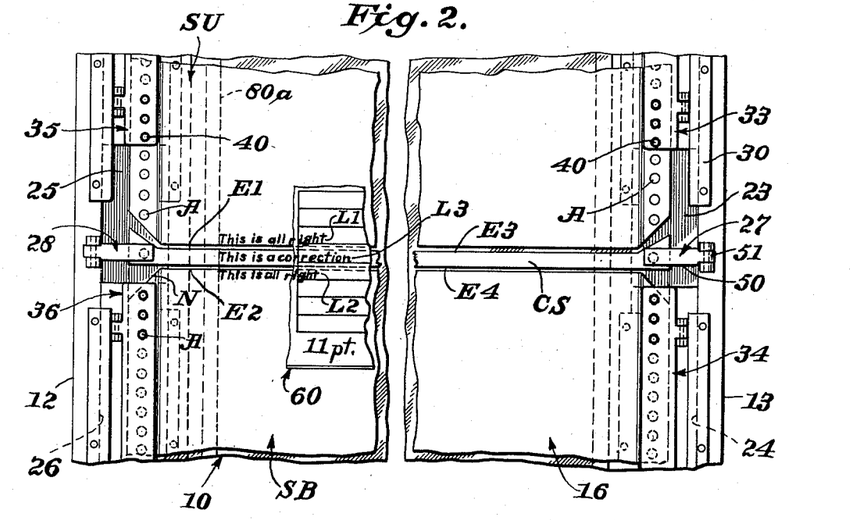
Figure 2 is a fragmental plan view showing the longitudinally central portions of the Figure 1 structure.

The portions of top wall 16 at the opposite side edges of the cut-out 20 and glass sheet 22 are provided with grooves or slideways shown in Figures 1 to 3. In more detail, two slideways 23 and 24 are provided at one side of the working surface formed by glass sheet 22 while two grooves 25 and 26 are provided at the other side of the working surface. It will be noted that slideway 23 extends from a point adjacent the rear end wall 15 of the cabinet to a point midway of the cabinet length, where a sheet engaging or holding member 27 is positioned. The other slideway 24 extends from sheet holding member 27 to a point near the front end wall 14 of the cabinet. The slideway 25 has the same length as the slideway 23 and terminates midway of the length of the cabinet at a sheet engaging or holding element 28. Slideway 26 then extends the same distance as the opposite and corresponding slideway 24.

The upper edges of the slideways have strips or plates 30 secured thereto which overhang the slideways and thereby retain slides or sheet holding or carrying members therein. The upper surfaces of the retaining plates 30 preferably lie in the same plane as the upper surface of the cabinet top wall 16 and the glass sheet 22. However, the retaining strips 30 are relatively thin as indicated in Figure 3 so that the slides which move beneath them may have their upper surfaces at least closely adjacent the upper surface of top wall 16 and glass sheet 22. Slides 33 and 34 are respectively positioned in the slideways 23 and 24 and slides 35 and 36 are respectively positioned in the slideways 25 and 26. All four slides or sheet holding members are of similar construction in that, as best shown in Figures 2 and 3, each includes a base plate 37 of such cross-section as to closely fit within the corresponding slideway and beneath the retaining strips 30. In addition, each slide has a clamping plate 38 hinged to its base plate 37 as indicated at 39 in Figures 1 and 3. As is indicated in Figures 2 and 3, the base plates 37 of the slides have prongs 40 extending upwardly therefrom at their ends nearest the fixed holding members 27 and 28. The upper plate 38 of each slide is provided with apertures which cooperate with the prongs 40 to hold sheets.

The above-mentioned prongs are provided to enable the slides to engage sheets of paper having a row of holes punched therein adjacent each side edge. Therefore, the prongs are equidistantly spaced in a row along the respective slides or sheet holding members.

As is indicated in Figure 2, no more than several prongs 40 will usually be provided on each slide or sheet holding member, and they will be positioned on the adjacent ends of the members. Figure 3 shows the upper clamping element 38 of a slide swung to open position.

As best shown in Figure 3, the slides 34 and 36 at one end of the cabinet have rack teeth on their under surfaces adapted to be engaged by gears 44 fixed to a cross shaft 45 journalled in the side walls 12 and 13. The gears 44 extend through apertures in the top wall 16 to engage the base plates of the slides. Shaft 45 carries an operating handle or wheel 46 by means of which the two front slides 34 and 36 may be moved in unison toward and away from the fixed sheet holding elements 27 and 28 and precisely located with respect thereto. The slides 33 and 35 at the rear and opposite end of the cabinet are similarly connected to a shaft, not shown, equipped with an operating knob 47.

Referring to the fixed sheet holding elements 27 and 28, each of these includes a base portion having its upper surface lying substantially flush with the upper surface of the cabinet wall 16 and a clamping plate designated 50 hinged to the base plate as indicated at 51. If desired, the base portions of the elements 27 and 28 may be integral with the top wall 16 of the cabinet. Each of the two fixed sheet holding elements 27 and 28 is provided with a single upwardly extending prong and their clamping plates are apertured in the manner described above in connection with the slides. Also, the fixed sheet holding elements are mounted directly opposite so that their prongs will be in transverse alignment.

Figure 5:
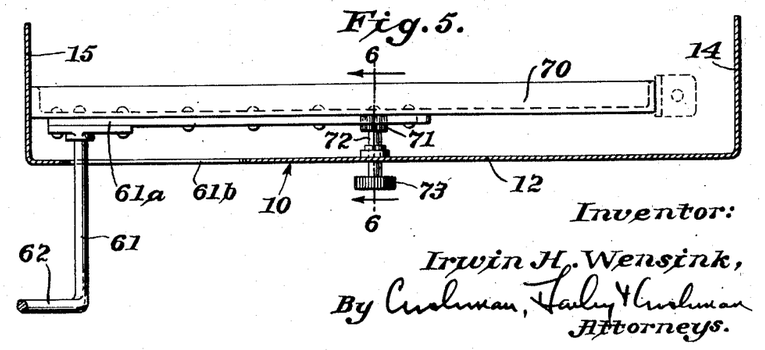
Figure 5 is a section on the line 5—5 of Figure 4.

As is best shown in Figures 1 and 4, a gauging and measuring device generally designated by the numeral 60 is associated with the device of Figure 1. As is illustrated in Figures 4 and 5, the gauging device includes a support comprising a rod 61 which projects from a carrier 61a and thence through a slot 61b in the side wall 12 of the cabinet. Rod 61 includes an upwardly and rearwardly projecting portion 62 and a relatively long cross-arm portion 63 (Figure 1) which projects entirely across the cabinet, normally along a line slightly above and rearwardly of the cabinet rear wall 15. The gauging device 60 includes a sheet 64 of transparent material carried at the free end of a metal plate 65. The opposite end of metal plate 65 includes a sleeve portion 66 which surrounds the cross-rod portion 63. Sleeve 66 is arranged to pivot or rotate about the rod portion 63 so that the sheet 64 may be swung upwardly to the dotted line position indicated in Figure 4 from its normal lowered position indicated in Figure 1 and in solid lines in Figure 4. When the gauging device has been lifted from the solid line position shown in Figure 4 it can be caused to slide along rod 63 so that the gauge plate 64 can be positioned to lie flat in any position transversely of the glass working surface 22. Sleeve 66 and rod portion 63 are provided with cooperating teeth indicated at 67 to limit the downward movement of the gauging device to the position indicated in solid lines in Figure 4.

As is hereinafter more fully explained, the transparent plate 64 of gauging device 60 has groups of lines scribed on its under surface, the lines of each group being spaced apart by different distances. The spacing between the lines in each group is indicated by the numerals such as 6 to 13 appearing on plate 64 in Figure 1, the numeral 6, for example, indicating that the lines in the associated group are spaced apart by 6 points, printers' measure.

In order that the gauging device 60 may be moved with precision to different positions between the front and rear edges of the working surface 22, the carrier 61a to which the rod 63 is fixed is slidable along an angled strip 70 mounted within the cabinet as shown in Figures 4 to 6. Carrier 61a also has rack teeth formed thereon adapted to be engaged by a pinion 71 fixed to a stub shaft 72 journalled in the side wall 12 of the cabinet and the angled strip 70. An operating knob or handle 73 is also fixed to the shaft 72. Obviously, rotation of knob 73 will position the gauging plate 60 at any desired point between the front and rear edges of the working surface 22.

The manner of using the device of Figures 1 to 6 in one of the operations for which it is designed is as follows:

Assume that copy from which a printing plate is to be made as hereinafter described has been typewritten upon a sheet of paper and it is desired to correct a line therein. To meet this condition, the line to be corrected would be cut from the sheet, for example, by an apparatus such as hereinafter described in connection with Figures 7 to 11a. The two remaining parts of the sheet are illustrated in Figure 2 wherein part SU is the portion of the original sheet above the discarded line, while the portion SB is the portion of the sheet below the discarded line. It will be observed that the lower edge E1 of sheet SU preferably is cut along a line immediately adjacent the lower ends of the descenders of the characters of the lowermost line L1 on sheet portion SU. Similarly, the upper edge E2 of sheet portion SB preferably is immediately adjacent the upper ends of the ascenders of the characters of the uppermost line L2 of that sheet portion. The foregoing will hold true regardless of how many lines of the original sheet are cut out.

As is indicated in Figure 2, the portions SU and SB of the original sheet will be respectively mounted on the upper and lower pairs of sheet holders 33 to 36. The sheets preferably will be provided with spaced apertures such as indicated at A in Figure 2, and the apertures nearest the trimmed edges will be fitted over the prongs 40 of the sheet holders. Sheet portions SU and SB preferably would have their edges E1 and E2 closely adjacent the facing ends of the slides or sheet holders as is indicated with regard to the sheet SB in Figure 2. In cutting the original sheet, after the two necessary straight cuts have been made to provide the edges E1 and E2, these edges may then be cut back at their corners to be roughly bevelled as indicated at N in Figure 2 and for a purpose subsequently made clear. The edges E1 and E2 usually should project beyond the facing ends of the holders as is indicated with respect to the sheet part SB in Figure 2.

The prongs 40 will only be provided upon the device of Figures 1 to 6 if it is designed to be used with sheets provided with rows of apertures A along their margins. If the sheets to be handled are not apertured, the sheet holding elements of the device of Figures 1 to 6 may simply be frictional clamps. In such case, particularly, the lines 80, 80a and 80b (Figure 1) shown scribed on the upper surface of the glass sheet 22 will assist in the orientation of the sheet portions. These lines will be of a different color than the lines formed on the gauging device 60. For example, if the lines 80, 80a and 80b are red, the lines of the device 60 may be green. The line 80a will be in registry with that point on a copy sheet which corresponds to the leftward extremity of the type-receiving area of a typewriter platen. Line 80 will coincide with the median point of the maximum width of the typing area.

The line of copy which is to replace the deleted line of the original sheet from which portions SU and SB have been cut will be typed upon an additional sheet of paper and the portion of the new sheet bearing the corrected line of copy will be cut substantially to the form of the strip CS illustrated in Figure 2. This may be done by means of the cutting device hereinafter described in connection with Figures 7 to 11a. This cutting will be along lines parallel to the line of copy shown on strip CS. Also, to prevent overlapping of sheets in final position, the lines of cutting will preferably be immediately adjacent the upper and lower portions of the line of copy.

The strip CS illustrated in Figure 2 carries but one line of copy, and which line is not centered with respect to the apertures A provided on the strip. In such case, the ends of the strip may be cut at an angle so as to insure that each end of the strip will include an aperture A. If the strip CS carries a sufficient number of lines of copy or the line of copy carried thereby happens to be centered with respect to apertures A, this angling of the ends of the strip will not be necessary. It will be understood that in no case will it be necessary to observe any particular relationship between the apertures A on a sheet being typed and the lines of copy placed upon the sheet although it is usually important to insure that the copy is placed upon the sheet on lines at right angles to the lines of apertures A.

The strip CS will now be secured to the fixed sheet holders 27 and 28 in the manner illustrated in Figure 2, and the slide operating knobs 46 and 47 will be operated to so move the corresponding movable sheet holders as to bring the sheet portions SU and SB to the desired positions with respect to the strip CS. Assuming that the type being used is of 9 point size and that there is a 2 point spacing or "leading" between lines, it will be necessary to insure that corresponding points on the lowermost line L1 of sheet portion SU is spaced 11 points from the corresponding points on the line L3 of strip CS and that a corresponding spacing is provided between the line L3 and the uppermost line L2 on sheet portion SB. This spacing can be assured by moving the gauge device 60 upwardly from the solid line position of Figure 4 to the dotted line position of the same figure and then moving it to the right in Figure 1 so that the 11 point scale of the transparent gauging plate 64 will be positioned as shown in Figure 2. Gauging plate 64 can be positioned at any desired point between the front and rear edges of the working surface or sheet 22 by operation of the knob 73.

Referring to Figure 2, it will be observed that the 11 point scale of gauging plate 64 has a line thereof positioned at the base of the line L3 on strip CS and that the sheet holders carrying the sheets SU and SB have been so positioned by operation of the operating knobs 46 and 47 as to bring the lines L1 and L2 to the proper position with respect to other lines of the 11 point scale of gauging plate 64. With this positioning accomplished, the line L3 on the strip CS will occupy exactly the same position with respect to the lines L1 and L2 on sheet portions SB and SU as was occupied by the deleted line of the original sheet. The source of light 17 within the cabinet will assist in the above alignment.

Adhesive strips may be applied to the marginal portions of the sheet portions SU, CS and SB so as to secure these sheet portions together in this aligned and properly spaced relationship. The adhesive strips will be positioned entirely outside the copy bearing areas of the sheet, viz., outside of the type bearing areas as well as such marginal portions as may be reproduced during photoprinting or other subsequent processes. Obviously, if the adhesive tape is located within the copy bearing area referred to above, the strips would cause difficulty in the photoprinting or other later reproduction steps.

It will be noted that the copy placed upon the strip CS must be in transverse alignment with the sheet portions SU and SB. This may be accomplished easily by reasonable care during the typing operations, but if it is preferred the fixed copy holders 27 and 28 may be mounted for simultaneous movement transversely of the working surface 22.

It will be observed that the device of Figures 1 to 6 will have many uses in the preparation of copy for plating in addition to the use which has just been described. It may be used in the incorporation of running heads and page numbers, the adjustment of spacing, incorporation of separately composed headings or of illustrations, assembly of the various other components of a page, and in other operations associated with page makeup and readjustment thereof. The operation of this device in the performance of these various functions will be obvious to those skilled in the art.

After a sheet has been made up with the aid of the device of Figures 1 to 6, a printing plate may be produced therefrom in the usual manner. If a transparency is to be made by a photographic process, it is not necessary that the copy sheets be transparent although it will be desirable to have them at least sufficiently translucent that the source of light 17 will assist in the various measuring and line-up operations. However, it is obvious that the system described above readily lends itself to a process in which copy sheets are used in place of photographically produced transparencies in the production of printing plates. In the latter case, it will be necessary that the paper be substantially transparent.

Figures 7 to 11a disclose a cutting device included in the invention and which is highly useful in assuring that sheets of copy may be trimmed along desired lines.

Figure 7:
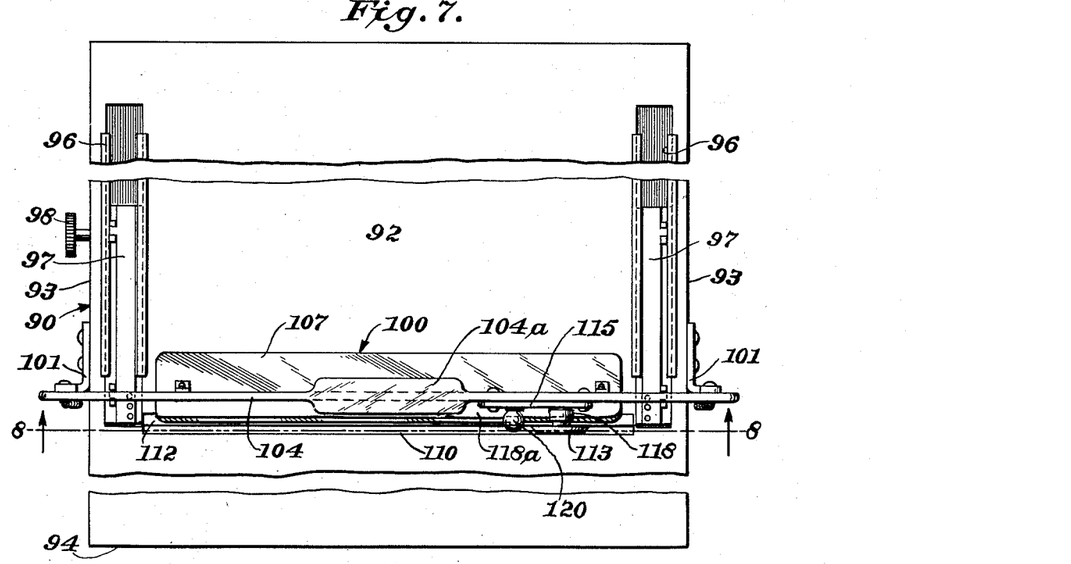
Figure 7 is a plan view, with portions broken out, of a cutting device included in the invention.
Figure 8:
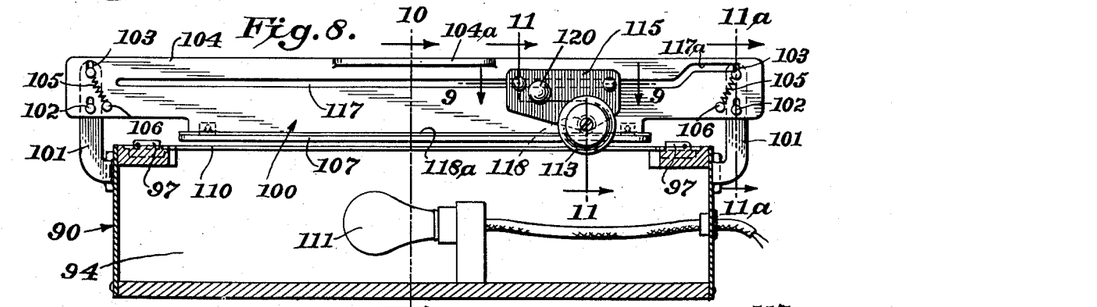
Figure 8 is a vertical section on the line 8—8 of Figure 7.

Referring to Figures 7 and 8, the numeral 90 generally designates the cabinet of the cutting device and which cabinet includes a bottom wall 91, a top wall 92 and side walls 93 and end walls 94. The top wall 92 of the cabinet preferably will be formed of metal or other opaque material and its upper surface will comprise the working surface of the device. In addition, the top wall 92 must be of sufficient dimensions to enable sheets of the size used in the invention to be laid flat thereon.

A slideway 96 similar in form to the slideways 23 to 26 of Figures 1 and 3 is provided adjacent each side edge of the top plate 92 of cabinet 90 and each slideway has a slide or sheet holder 97 mounted therein and of the same construction as the sheet holders 33 to 36 of Figures 1 and 3. The slideways and slides of cabinet 90 are parallel as illustrated in Figure 7 and simultaneously operable by means of gears, racks and a knob, the latter being indicated by the numeral 98. If the slides are provided with prongs to engage apertures in the sheets, these prongs will be equidistantly spaced along the slides in a straight row. As is also indicated in Figure 7, if prongs are provided it usually only will be necessary to have them at the end of the slides or sheet holders which are adjacent a pressure plate and cutting device generally designated by the numeral 100.

Figure 11:
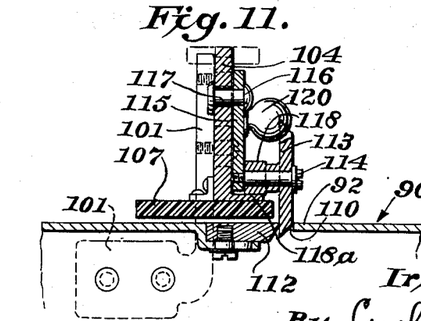
Figure 11 is a section on the angled line 11—11 of Figure 8.
Figure 11A:
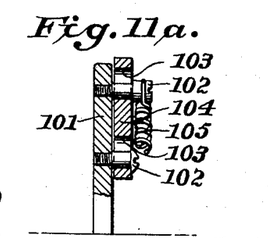
Figure 11a is a detail section on the line 11a—11a of Figure 8.

Posts 101 are fixed to the side walls 93 of cabinet 90, and these posts extend above the top surface of the cabinet as shown in Figure 8. Each post is provided with a pair of vertically spaced machine screws 102 and, as is best shown in Figure 11a, the screws pass through vertically arranged slots 103 in a horizontally arranged bar 104. As is best shown in Figures 8 and 11a, a spring 105 extends from one of the screws 102 of each post 101 to a stud 106 secured to a lower portion of bar 104, the springs 105 thus serving to hold bar 104 upwardly with respect to posts 101. When bar 104 is held upward, a transparent presser foot 107 secured to the lower edge of the bar will be held out of contact with the upper surface of the top plate 92 of the cabinet.

Cabinet 90 is provided with a slot 110 positioned adjacent and extending parallel to one edge of the presser plate 107. As is illustrated in Figure 7, slot 110 terminates between the slideways 96. An electric lamp 111 is positioned in the cabinet 90 beneath the slot 110 so as to direct light upwardly through the slot. As is also shown in Figure 11, one edge of the slot 110 is formed by a shear plate 112 suitably secured in the top plate 92 of cabinet 90, the shear plate being intended to cooperate with a rotatable cutting disc 113 hereinafter described.

The cutting disc or wheel 113 is journalled on a stud 114 threaded in a plate-like carriage 115 which is mounted for movement lengthwise of bar 104 by the following arrangement: As shown in Figure 8, a pair of pins or rivets 116 secured to the carriage extend through a slot or trackway 117 having its major portion horizontal and extending lengthwise of bar 104. When both of the pins 116 are positioned in the horizontal portion of slot 117, the cutting disc 113 will extend down into the slot 110 of cabinet 90 and the hub 118 of cutting disc 113 will bear upon the upper surface of a narrow shoulder 118a which extends along bar 104 immediately above the upper surface of the presser foot 107. By having hub 118 bear on shoulder 118a rather than on the upper surface of the presser foot, a satisfactory frictional drive of disc 113 can be obtained without possibility of scratching the presser foot and thereby affecting its transparency.

Figure 8A:
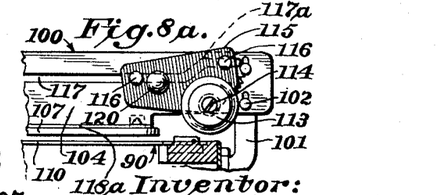
Figure 8a is a fragmental section similar to that of Figure 8 but showing the cutter slide in non-cutting position.

The horizontal portion of slot or trackway 117 is of sufficient length with respect to the cutting slot 110 so that cutting disc 113 will move the full length of the slot 110 and will have a cutting action throughout such movement. Beyond one end of its major portion, slot or trackway 117 includes a vertically offset portion indicated at 117a. Referring to Figure 8a, when the carriage 115 has one pin 116 positioned at the extreme end of the offset portion 117a, the cutting disc 113 will be entirely out of the slot 110 as well as clear of the working surface and sheet holders 97.

In the use of the device of Figures 7 to 11a, with the cutting element 113 in the position shown in Figure 8a, a sheet to be trimmed along a desired line will be secured in the sheet holding members or slides 97. Then the slides may be adjusted by operation of the knob 98 so as to bring the point along which the sheet is to be cut in registry with the cutting edge of the shear plate 112 which forms one edge of cutting slot 110. The provision of a light source beneath the slot 110 will enable the sheet to be exactly and carefully registered for cutting. The fact that the presser foot 107 is transparent will also enable the above-mentioned registry to be more readily obtained. Then bar 104 and presser foot 107 may be pressed downwardly by pressure exerted upon a horizontal flange 104a at the top edge of bar 104. Hence, the presser foot will clamp the portion of the sheet which is adjacent cutting slot 110 against cabinet top wall 92. Carriage 115 may now be moved from the Figure 8a position by means of a knob 120, thereby bringing the hub 118 of the cutting disc into engagement with the upper surface of shoulder 118a. This engagement will cause the cutting disc to rotate and thereby cut the sheet as the carriage moves along bar 104. With cutting completed, the cutting disc may be returned to the position shown in Figure 8a and downward pressure removed from bar 104 so that the springs 105 may return the bar to the raised position illustrated in Figure 8.

Figure 9:
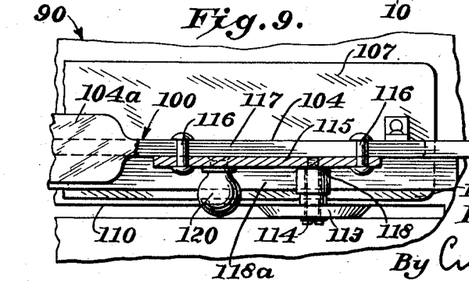
Figure 9 is a fragmental section on the line 9—9 of Figure 8.
Figure 10:
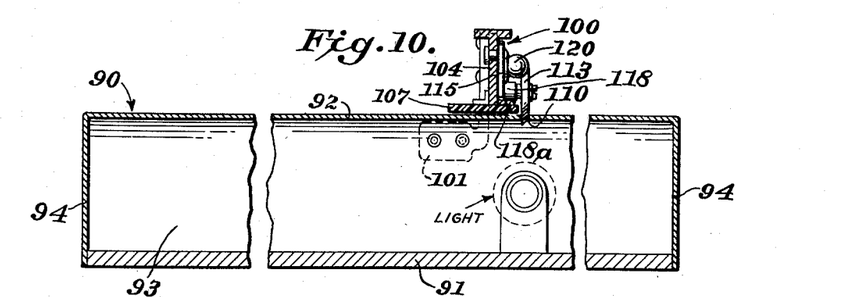
Figure 10 is a section on the line 10—10 of Figure 8.

It will be understood that the edge of presser foot 107 shown lowermost in Figure 9 will be spaced further from the shoulder 118a than is indicated in Figures 7, 9 and 11. A larger portion of the sheet adjacent the line of cutting thereby will be visible.

It will be observed that the sheet will not be cut to the edges engaged by the slides or sheet holders 97. These edge portions of the sheet can thereafter be cut by hand to either continue the edge formed by the cutting disc, or angled to the form illustrated in Figure 2.

Figures 12 to 19 illustrate a copy preparation device which is particularly adapted for use in drawing lines or illustrations upon a sheet or to assist in locating any copy or illustrative matter upon or adjacent to a sheet.

The device of Figures 12 to 19 includes a cabinet 130 including a top wall 131, a bottom wall, side walls 132 and 133, a front wall 134 and a rear wall 135. The top wall 131 of the cabinet has its central portion cut away, with a ledge 136 (Figure 15) along the edge of the cut-out. Ledge 136 serves to support a translucent sheet 137 of glass or plastic material. Sheet 137 comprises the working surface of the device and, if desired, a source of light may be positioned beneath the sheet.

Figure 12:
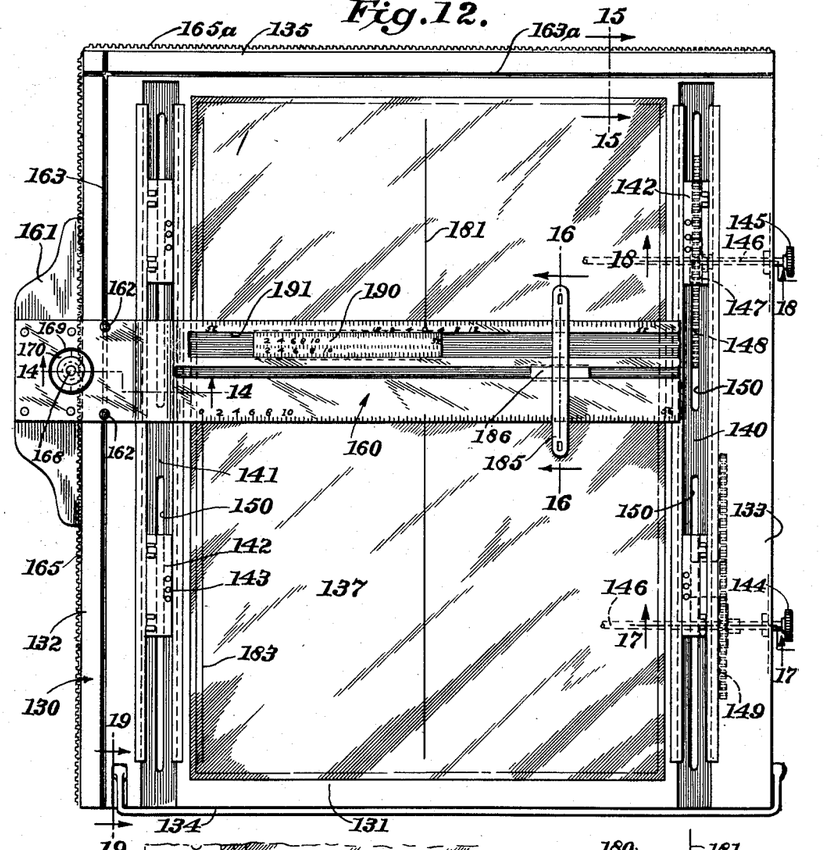
Figure 12 is a plan view of another device of the invention.

Wall 131 has a slot 140 provided adjacent and parallel to its right-hand side edge and a second slot 141 is provided adjacent its left-hand side edge. These slideways are of the same form as the slideways 23 to 26 of Figure 1 but are uninterrupted throughout the length of the cabinet. Each slideway has two slides or sheet holders 142 mounted therein, each slide being of the same form as the slides 33 to 36 of Figure 1 although it is preferred that the slides be provided with prongs 143 positioned centrally of the length of each slide. The pair of slides at corresponding ends of the slideways are connected for simultaneous operation by means of operating handles or knobs 144 and 145 arranged adjacent the side wall 133 of the cabinet. The knobs are respectively mounted upon shafts 146 journalled in the side walls of the cabinet and which shafts carry pinions 147 meshing with rack bars 148 and 149 depending from the slides.

Figures 16, 17, 18:
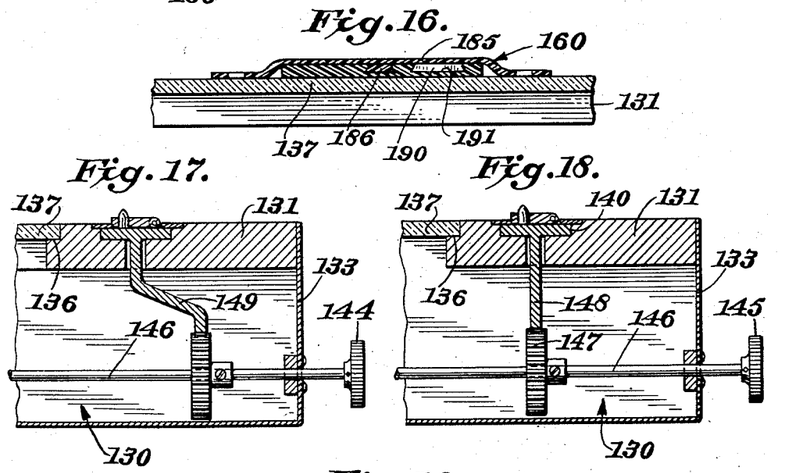

As is shown in Figure 12, the slideways 140 and 141 have relatively long slots 150 extending lengthwise thereof and through each of which extends the element connecting a slide with its rack bar. In the operation of the device of Figures 12 to 19, it will usually be desirable to have the slides engage the end portions of the sides of the sheets rather than the central side portions. For that reason, the slides must be arranged for movement throughout a relatively long distance. To accommodate this action, the rack members 149 of the slides at one end of the slideways may be laterally offset as shown in Figure 17 so that the long rack members will not interfere with each other during extended travel.

The cabinet 130 carries a straight-edge or T-square generally designated 160 formed of transparent material and extending the full width of the working surface 137. Straight-edged element 160 is provided at its left-hand end (Figures 12 and 14) with a head portion 161 adapted to closely engage and abut against the side wall 132 of cabinet 130. In order to further secure the straight-edged element in this position, the element is provided with a pair of pins 162 adapted to closely engage a slot 163 formed in the cabinet top wall 131 parallel with the cabinet side wall 132.

A rack member 165 is fixed to the outer surface of cabinet side wall 132 and is adapted to be engaged by a gear 166 fixed to a shaft 167 journalled in an aperture formed in the head 161 of the straight-edged member. An operating handle or knob 168 is also fixed to the shaft 167 above the straight-edged member. Rotation of knob 168 will enable the straight-edged member to be finally and exactly adjusted to any desired position between the front and rear edges of the working surface 137. In order that movement can be accomplished from one position to a second position closely measured with respect to the first position, the shaft 167 is provided with a pointer 169 adapted to cooperate with a scale or dial 170. This dial may bear markings either indicating standard linear measurements or type measurements, or both. Dial 170 is preferably rotatable about shaft 167. Because of this arrangement, the dial may be turned to bring its "zero" marking in alignment with the pointer 169 and the latter then rotated to thereby move the straight-edged member 160 an accurately measured distance along the working surface 137.

If it is desired to move the straight-edged element independently of the rack teeth 165, knob 168, its shaft 167 and gear 166 may be pulled upwardly to bring an annular groove 167a in the shaft opposite a spring-pressed ball. Gear 166 will thus be held free of rack 165. The straight-edged member 160 is provided with an offset such as indicated in Figure 14 at 174 and so that the slides 142 and straight-edged member will not interfere with one another.

Figure 14:
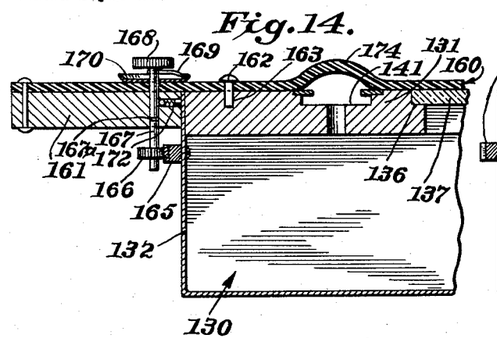
Figures 14 through 19 are transverse sections on the lines 14—14 through 19—19, respectively, of Figure 12.

As is clear from Figure 14, the straight-edged member 160 readily can be removed from the crosswise position illustrated in Figure 12 by simply lifting the straight-edged member directly upwardly.

Figure 15:
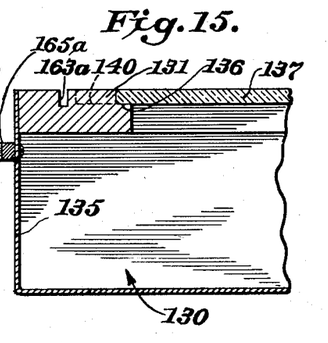

As is illustrated in Figures 12 and 15, the top wall 131 of the cabinet is provided near rear wall 135 with a slot 163a and wall 135 has a rack member 165a extending across the length of the same. By these arrangements, the straight-edge elements may be lifted from the position shown in Figure 12 and mounted at right angles to the position shown in Figure 12. At such time, pins 162 will engage slot 163a and gear 166 will engage the rack teeth 165a.

Figure 13:
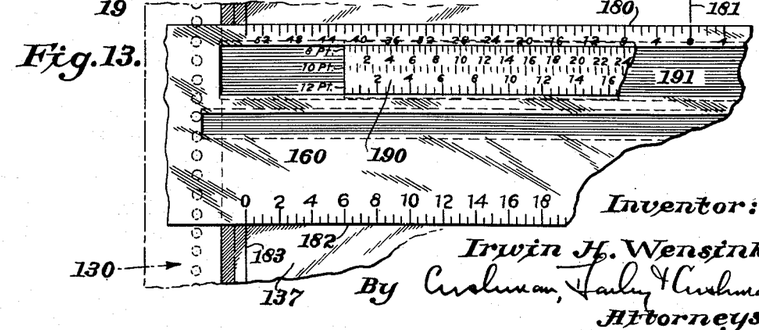
Figure 13 is a plan view of a portion of the straight-edged element of Figure 12, but on a larger scale.

As is best shown in Figure 13, one edge of the straight-edged element 160 will be provided with a scale scribed on its under surface of such kind as may be desirable. For example, markings designated 180 will be provided on the edge shown uppermost in Figure 13, these markings reading in both directions from a central point on the straight-edged member, viz., a point which will lie centrally of the working surface 137 when the straight-edged member is in the position illustrated in Figure 12. The working surface 137 will preferably have a line 181 scribed on its upper surface and extending through this zero point. The lower edge of the straight-edged member 160 will be provided with markings 182 scribed on its under surface on the same scale as the markings 180 but originating at a point which will coincide with a line 183 scribed on the upper surface of 137 and extending parallel to line 181 but adjacent the left-hand edge of the working surface 137. It will be perceived that by the scale measurements just described, copy may either be centered with respect to the central line 181 or positioned a predetermined distance from the left-hand scribed line 183, or the two scales may be used in various ways to measure and locate points crosswise of the working surface. Because straight-edged element 160 may be moved forwardly and rearwardly of surface 137 under substantially micrometric control, measurements lengthwise of surface 137 are also possible. An even wider range of lengthwise measurements is obviously possible by positioning element 160 at right angles to its Figure 12 position.

If an apparatus of Figures 12 through 19 is to be used in conjunction with an apparatus of Figures 1 to 6, the lines 181 and 183 of the Figures 12 to 19 apparatus will be spaced the same distance apart as the lines 80 and 80a of the apparatus of Figures 1 to 6. Also, the lines 183 and 80a of the respective apparatus will be the same distance from the left-hand edge of the sheet.

In order to assist in locating copy upon the working surface 137, or to assist in the making of guide marks, a transparent member 185 is slidable along the straight-edged member 160. This movement is accomplished by means of the dove-tailed block and groove arrangement generally indicated at 186 in Figures 12 and 16. Member 185 extends beyond the parallel edges of the straight-edged member 160 but has its outer ends downwardly offset as shown in Figure 16 so that they will lie close to but above the working surface 137. The end portions of member 185 will be slotted as shown in Figure 16 to assist in making guide marks and a line will be scribed on the under surface of member 185 between these slots.

A movable scale 190 is also carried by the straight-edged member 160, scale 190 likewise having a dove-tailed fit in a groove 191 formed in the upper surface of the straight-edged member. As is shown in Figure 13, the movable scale member 190 will bear markings scribed on its upper surface according to a number of units of measurement. Scale member 190 will be used in locating copy at desired distances from the lines 181 and 183 as well as with respect to points on other copy.

As has been indicated above, the device of Figures 12 to 19 may be used to either draw straight lines or any illustration upon a sheet or to assist in locating any copy or illustrative matter upon or adjacent to a sheet. For example, if a sheet has typed copy thereon and it is desired to locate other matter or an illustration at a specific point with respect to the typed copy this can be done as follows: The sheet to be worked upon is secured in the sheet holding devices or slides 142 in the manner explained in connection with Figure 1, the members 142 being moved to the desired position to hold the sheet taut upon the working surface 137. Then the added material can be located on or adjacent to the basic sheet by the use of the straight-edged member 160, using one or more of the various scales of that member to locate the copy as required. Or, if lines are to be drawn upon the basic sheet or added sheet, this can be done by use of the straight-edged member 160 using the straight-edged member either in the position illustrated in Figure 12 or in the position at right angles thereto. As would be desirable in each of these example operations, exact adjustment of the straight-edged member 160 can be made by operation of the dial or knob 168. Because the straight-edged member has scales reading both from its left-hand edge and from a central point, and also includes the movable scale member 190, any material or marking can be accurately and quickly located. The fact that the straight-edged member 160 as well as the supplemental member 185 and the movable scale 190 are transparent will greatly facilitate all of the above-mentioned operations.

Figure 19:
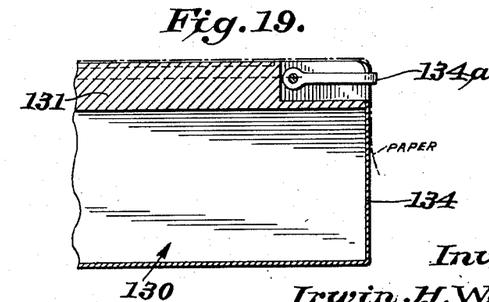

When the operations to be performed on a copy sheet are sufficiently intricate to justify such a course, a blank sheet may be laid over the sheet to be worked upon, being secured in the uppermost sheet holding devices 142 and by the pivoted clamp 134a of Figure 19. Portions of the edges of this overlay sheet may be cut off as necessary in order not to be engaged by the lowermost sheet holding devices 142. Guide marks may then be made as necessary on this overlay sheet. The respective positions of the sheet to be worked upon and this overlay sheet may then be transposed and the work may proceed with the aid of the guide marks on the original overlay sheet which will now be visible through the sheet to be worked upon. This system of laying one sheet over another will also be helpful in the preparation of copy for color plates.

Generally speaking, it will be observed that the devices of Figures 1 to 6 and 12 to 19 can be used to make up, assemble, or readjust copy in any desired manner, just as is customarily accomplished when working with set type by the manipulation of type, cuts, rules, and spacing material.

If the matter which has been located upon or adjacent to the sheet is a separate sheet, it can be adhesively secured to the basic sheet for subsequent photoprinting operations. Characters such as hereinafter described in connection with Figures 20 to 31 also may be located upon a sheet by the use of the device of Figures 12 to 19.

Figures 20, 21:
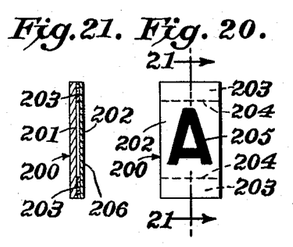
Figure 20 is an elevation of a character element included in the invention.
Figure 21 is a section on the line 21—21 of Figure 20.

Figures 20 to 31 illustrate a character element and a system of assembling such elements in lines for use in makeup. Referring to Figures 20 and 21, the character element 200 there illustrated comprises a backing sheet 201 formed of thin but fairly stiff material such as light cardboard, and a character sheet 202 preferably formed of flexible material, the two sheets being secured together by bodies 203 of permanent adhesive. The bodies 203 of adhesive extend entirely across the ends of the element. The bodies 203 also extend inwardly from the upper and lower edges or ends of the character elements to lines 204 which are spaced outwardly from the nearest adjacent point of the character 205 imprinted upon the sheet 202.

It will be understood that the character elements 200 will be distributed in sets bearing characters including all of the letters of the alphabet as well as numerals, symbols, designs and the like. The character sheet 202 is preferably light-transmissive.

The undersurface 206 of sheet 202 will bear a pressure sensitive adhesive which will be free of, viz., will not be in secured contact with the opposed face of the backing element 201. This adhesive preferably will be of such nature that it must be rubbed with a hard element, such as a bone, before it will adhere to any surface, and will be transparent when it has thus been rubbed.

The numeral 210 designates a composing stick provided with an undercut groove 211 of a proper size to receive the character elements. As is shown in Figures 22 and 23, the overhanging edges 212 of the composing stick groove 211 will only partially overlie the bodies 203 of adhesive; in fact, these bodies of adhesive and the edges 212 of the composing stick groove preferably will be arranged as indicated in Figures 22 and 23 so that the composing stick groove edge 212 will terminate intermediate one outer end of a body 203 of permanent adhesive and the line 204 which defines the inner edge of that body.

Figures 22, 23:
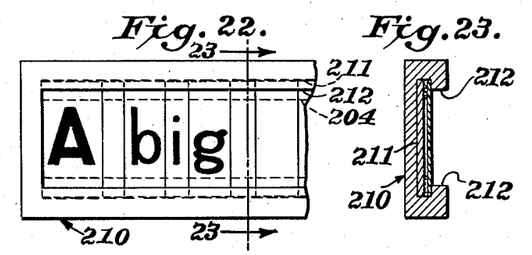
Figure 22 is a plan view of a composing stick which has inserted and assembled therein character elements such as shown in Figures 20 and 21.
Figure 23 is a section on the line 23—23 of Figure 22.
Figure 24:
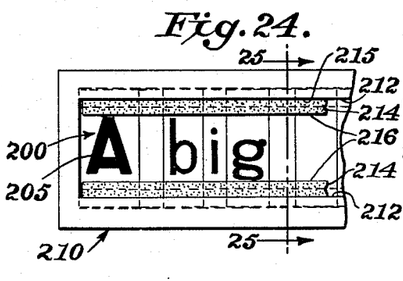
Figure 24 is a view similar to Figure 22 but illustrating a subsequent step of the method of the invention.

The character elements 200 will be assembled in the composing stick 210 to form words or designs as indicated in Figure 22. With the adjacent character elements in edgewise relationship, strips of adhesive tape 214 will be applied to the assembled character elements in the manner illustrated in Figures 24 and 25 to secure them together. In more detail, it will be observed from Figure 24 that the strips 214 are only of such width that when their outer edges 215 are positioned in abutment with the adjacent edge 212 of the composing stick groove, the opposite and inner edge 216 of the strip will be well clear of the printed characters 205. However, as shown in Figure 25, the inner edge 216 of each strip 214 is positioned inwardly with respect to the inner edge 204 of the body 203 of permanent adhesive, while the outer edge 215 of each strip 214 is positioned substantially midway of the inner and outer edges of the adhesive body 203.

Figures 25, 26, 27:
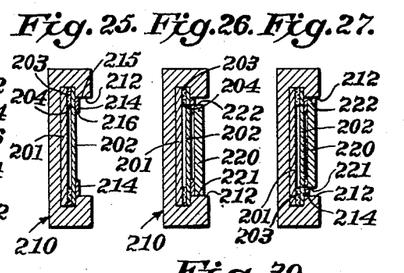
Figures 25 through 27 are sectional views taken on the line 25—25 of Figure 24 and illustrating successive steps in the method.
Figure 28:
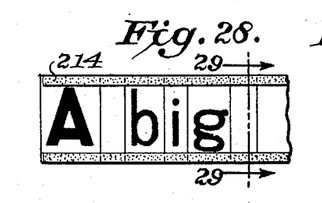
Figure 28 is a plan view showing the assembled character elements removed from the composing stick of Figure 24.

Referring to Figure 26, a straight-edged element 220 is now positioned in the composing stick groove with one edge in contact with the groove edge 212 of the composing stick. The straight-edged member 220 is of such width that its opposite edge 222 will lie at a point midway of the width of the adhesive strip 214 and just inwardly of the inner edge 204 of the body 203 of permanent adhesive. As a result, if a knife is now moved along the edge 222 of the straight-edged element 220, the adhesive strip 214 will be cut midway of its width and the sheet 202 of the character element 200 will be freed of the adjacent body 203 of permanent adhesive and the backing element 201. As is indicated in Figure 27, the straight-edged element 220 may now be pushed upwardly to the position there illustrated so that its edge 222 will abut the opposite overhanging edge 212 of the composing stick groove, causing its edge 221 to lie midway of the width of the other adhesive strip 214. By now moving a knife along the edge 221 of member 220, the lower portion of character sheet 202 will be freed from the adjacent body 203 of permanent adhesive and the backing element 201, and the corresponding strip 214 will be cut midway of its width.

Figures 29, 30:
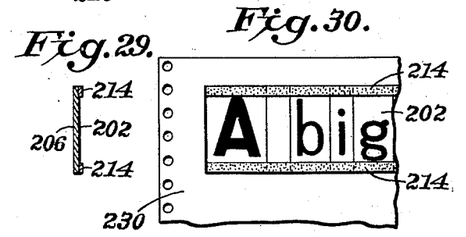
Figure 29 is a section on the line 29—29 of Figure 28.
Figure 30 shows the assembled character elements of Figure 28 applied to a sheet.

As a result of the cutting operations discussed in connection with Figures 26 and 27, the sheets 202 may now be entirely removed from the composing stick 210 and the backing sheets 201 but will still be held together in the desired alignment and spacing by the remaining portions of the strips 214. Thus secured together, the sheets 202 may be placed in desired location upon a large sheet 230 as indicated in Figure 30 with the aid of the apparatus of Figure 12 and pressure can be applied to the sheets 202 so as to activate the contact adhesive present upon their under surfaces 206. When this contact adhesive has been activated, the adhesive strips 214 may be entirely removed from the character sheets 202 and the undesired portion of sheet 230 also cut off by the use of the cutting device of Figures 7 to 11a, leaving the characters and sheet 230 in the condition illustrated in Figure 31.

Figure 31:
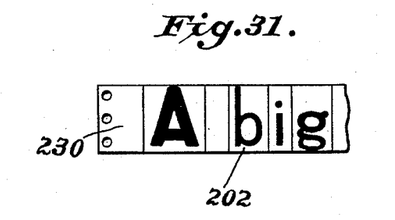
Figure 31 is a view similar to Figure 30 but showing a subsequent step in the process.

It will be obvious that characters and sheet 230 as shown in Figure 31 can then be assembled with other copy sheets by the use of the apparatus of Figure 1.

It will be observed that by the use of the character elements illustrated in Figures 20 and 21 and the method illustrated in Figures 20 to 31, character elements can be assembled and applied to a copy sheet without application of any adhesive carrying strips directly upon the characters. In addition, the very narrow adhesive strips 214 need not be left upon the character elements during subsequent operations such as photoprinting, the adhesive applied to the under surface 206 of the character sheets 202 enabling the character elements to stay in desired position during such operations. The contact adhesive applied to the under surface 206 may be of such nature as to be highly transparent when it has been rubbed as described above. Therefore, if the character sheets 202 are transparent, the system will be applicable in the making up of copy which will be used in place of a photographically produced transparency in producing a printing plate.

The terminology used in the specification is for the purpose of description and not of limitation, the scope of the invention being defined in the claims.

I claim:

1. In a copy preparation apparatus, a supporting frame provided with an upper and unobstructed planar working surface including two opposite side edges, a slideway in the supporting frame adjacent each of the edges of said surface, a sheet carrying slide in each of said slideways alongside of and lying substantially in the plane of said planar surface, and manually operable means operatively connecting the two slides for simultaneous movement in either of two opposite directions to independently selected positions, each of said sheet carrying slides being provided with means to selectively engage a portion of the edge of a sheet to hold the entire area of the sheet flat against said planar surface.

2. In a copy preparation apparatus, a supporting frame provided with an upper and unobstructed planar working and light-transmissive sheet supporting surface including two opposite side edges, sheet carrying means positioned adjacent each of the edges of said frame, a second sheet carrying means adjacent each of said edges, said second means being spaced from said first-mentioned means in a direction lengthwise of said edges, one of said sheet carrying means being manually and selectively movable in either of two opposite directions to move a sheet held thereon to independently selected positions with respect to a sheet held on the other sheet carrying means, both of said sheet carrying means lying substantially in the plane of said planar surface to hold sheets against said surface.

3. An apparatus of the character described in claim 2, including a sheet position gauging and measuring member and means to support the gauging and measuring member for movement with relation to the planar surface of said frame.

4. An apparatus of the character described in claim 2 wherein both of said sheet carrying means are selectively movable independently of each other and including an additional sheet carrying means positioned substantially in the plane of said planar surface and between said first and second sheet carrying means.

5. An apparatus of the character described in claim 2 including a stationary sheet carrying means positioned between the sheet holding means which are adjacent each edge of the frame.

6. In an apparatus of the character described, a supporting frame including a planar sheet supporting surface, means movable along said surface to move and hold a sheet upon said surface, a supporting element extending horizontally in a direction transversely of said surface and movable with respect to said surface along a line parallel to said surface and normal to said direction, and a plate element movable translationally with respect to said supporting element, said plate element being provided with measuring indicia.

7. An apparatus of the character described in claim 6 wherein the plate element is pivotally and translationally movable with respect to the supporting element.

8. In an apparatus of the character described, a supporting frame including a planar sheet supporting surface, a rod element extending transversely of and above the planar surface and including a portion lying laterally beyond said surface, and a plate-like gauging member pivoted upon the rod element, said member being translationally movable along the rod element to the portion of the latter lying laterally beyond the planar surface.

9. In an apparatus of the character described, a supporting frame provided with an upper and unobstructed planar working and sheet supporting surface, a pair of parallel slideways respectively extending along opposite edges of the planar surface, a sheet holding slide in each end portion of each slideway and lying substantially in the plane of said planar surface to hold sheets against said surface, and means operatively connecting the two slides at the corresponding ends of the slideways for simultaneous and selective movement, the connecting means at one end of the slideways being operable independently of the connecting means at the other end of the slideways.

10. In an apparatus of the character described, a supporting frame provided with a planar sheet supporting surface, a pair of parallel slideways respectively extending along opposite edges of the planar surface, a pair of sheet holding slides movable in each of the slideways, the slides at the corresponding ends of the two slideways being simultaneously movable by means comprising racks fixed to the respective slides, and gears rotatably mounted in the supporting frame.

11. In an apparatus of the character described, a supporting frame including a relatively opaque planar surface, said surface being provided with a transverse slot, means to selectively move a strip of light-transmissive material to position it on said surface and adjacent the slot, sheet holding means positioned beyond the ends of the slot in the planar surface, a cutting element movable lengthwise of the slot, and a light source within the frame to direct light through the slot and upon the portion of the sheet overlying the slot to make clearly visible the line along which the sheet will be cut.

12. In an apparatus of the character described, a supporting frame provided with a planar sheet supporting surface including two opposite side edges, a pair of arms extending upwardly from said surface, one adjacent each edge thereof, a clamping plate vertically movable on said arms, means to urge said plate upwardly with respect to the arms, said plate being provided with a trackway extending lengthwise thereof and including an upwardly offset portion at one end thereof, and a cutting element movable along said trackway.

13. In an apparatus of the character described, a supporting frame provided with a planar sheet supporting surface including two opposite side edges, a pair of arms extending upwardly from said surface, one adjacent each edge thereof, a clamping plate vertically movable on said arms, means to urge said plate upwardly with respect to the arms, said plate being provided with a trackway extending lengthwise thereof and including an upwardly offset portion, a cutting element movable in said trackway, means extending along each edge of the planar surface to hold a sheet of material, the vertically offset portion of said trackway being above one of said sheet holding means so that the cutting member may be positioned over the holding means to be upwardly and laterally clear of said sheet supporting surface.

14. In an apparatus of the character described, a supporting frame provided with a planar sheet supporting surface, means at each edge of the surface to hold a sheet thereon, a pair of arms extending upwardly from the supporting frame, one adjacent each of the opposite edges of the planar surface, a bar element extending between the arms, and including a shoulder, means to urge the bar member to upward position upon the arms, a transparent clamping plate depending from the bar and arranged to contact with said planar surface of the frame upon downward movement of tthe bar, a carrier movable lengthwise of the bar, a cutting disc rotatably mounted on said carrier on a horizontal axis, said cutting element including a hub portion to engage the shoulder on said bar element, the planar surface of the supporting frame being transversely slotted to receive and cooperate with the cutting element, and means within the frame to direct light upwardly through the slot in the sheet supporting surface.

15. In an apparatus of the character described, a supporting frame provided with a planar sheet supporting surface, a trackway on said supporting frame adjacent one edge of said surface, a straight-edged member movable along the trackway, the straight-edged member being formed of transparent material and provided with scale markings originating near one end thereof and a second series of scale markings originating at a point intermediate the first-mentioned scale markings, the straight-edged element being provided with grooves extending longitudinally thereof, a member provided with scale markings and movable in one of the grooves, and a second straight-edged member movable in the other groove and extending at right angles to the first-mentioned straight-edged member and beyond its edges.

16. In combination, a composing stick including a longitudinally extending recess, the longitudinal walls of the recess being undercut to receive the ends of character elements, and a straight-edged element of less width than the space between said walls of the recess and adapted to bear against one of said walls of the recess to serve as a guide in cutting off the opposite end of the character elements.

References Cited in the file of this patent

UNITED STATES PATENTS

| Number | Name | Date |
| --- | --- | --- |
| 83,870 | McLaughlin | Nov. 10, 1868 |
| 902,584 | Huebner | Nov. 3, 1908 |
| 1,090,240 | Scritsmier | Mar. 17, 1914 |
| 1,267,055 | Cathcart | May 21, 1918 |
| 1,455,501 | McGee | May 15, 1923 |
| 1,470,588 | Kirkland | Oct. 9, 1923 |
| 1,539,704 | Texoon | May 26, 1925 |
| 1,735,520 | Williams | Nov. 12, 1929 |
| 1,777,144 | Innes | Sept. 30, 1930 |
| 1,780,049 | Troyer | Oct. 28, 1930 |
| 1,794,648 | Shattow | Mar. 3, 1931 |
| 1,860,815 | Lucks-Osten et al. | May 31, 1932 |
| 1,933,835 | Alexander | Nov. 7, 1933 |
| 1,977,213 | Slobey | Oct. 16, 1934 |
| 1,978,417 | Dreisonstok et al. | Oct. 30, 1934 |
| 1,991,698 | Powers | Feb. 19, 1935 |
| 2,034,529 | Olsen | Mar. 17, 1936 |
| 2,065,253 | Trotter | Dec. 22, 1936 |
| 2,090,548 | Nielson | Aug. 17, 1937 |
| 2,267,710 | Ayres | Dec. 30, 1941 |
| 2,301,770 | Bassist | Nov. 10, 1942 |
| 2,328,471 | Leffel | Aug. 31, 1943 |
| 2,444,723 | Bowen | July 6, 1948 |

FOREIGN PATENTS

| Number | Country | Date |
| --- | --- | --- |
| 86,245 | Austria | Nov. 10, 1921 |